(12) United States Patent
Kent (10) Patent No.: US 7,274,358 B2
(45) Date of Patent: Sep. 25, 2007

(54) FOCUSING-SHAPED REFLECTOR ARRAYS FOR ACOUSTIC TOUCHSCREENS

(75) Inventor: Joel Christopher Kent, Fremont, CA (US)

(73) Assignee: Tyco Electronics Corporation, Middletown, PA (US)

( * ) Notice: Subject to any disclaimer, the term of this patent is extended or adjusted under 35 U.S.C. 154(b) by 435 days.

(21) Appl. No.: 10/752,935

(22) Filed: Jan. 6, 2004

(65) Prior Publication Data
US 2005/0146514 A1    Jul. 7, 2005

(51) Int. Cl.
G09G 5/00 (2006.01)

(52) U.S. Cl. .................. 345/177; 345/173; 178/18.04

(58) Field of Classification Search ........ 345/173–177, 345/156, 166; 178/18.04, 18.01, 18.03, 18.09, 178/18.11, 19.01, 19.02; 310/313 D
See application file for complete search history.

(56) References Cited

U.S. PATENT DOCUMENTS

| | | | |
|---|---|---|---|
| 3,483,563 A * | 12/1969 | Schroeder .................. 343/728 |
| 4,825,212 A | 4/1989 | Adler et al. |
| 4,880,665 A | 11/1989 | Adler et al. |
| 5,648,643 A | 7/1997 | Knowles et al. |
| 5,883,457 A | 3/1999 | Rinde et al. |
| 6,078,315 A * | 6/2000 | Huang ........................ 345/177 |
| 6,091,406 A | 7/2000 | Kambara et al. |
| 6,549,705 B1 * | 4/2003 | Laming et al. ................ 385/37 |
| 6,636,201 B1 * | 10/2003 | Gomes et al. .............. 345/173 |
| 6,692,137 B2 * | 2/2004 | Blanchard .................... 362/241 |
| 7,006,173 B1 * | 2/2006 | Hiyama et al. ............... 349/96 |
| 7,049,960 B2 * | 5/2006 | Waltermann ............. 340/568.1 |
| 7,075,525 B2 * | 7/2006 | Cheng et al. ................ 345/177 |

OTHER PUBLICATIONS

European Search Report for European Application No. 05100046.1, mailed Oct. 16, 2006.

* cited by examiner

Primary Examiner—Richard Hjerpe
Assistant Examiner—Mansour M. Said (57) ABSTRACT

An acoustic touchscreen having a substrate capable of propagating acoustic waves, the substrate having a touch-sensitive area, and an array of acoustically reflective elements lying in or on the substrate are positioned to transmit or receive acoustic signals into or out of the touch-sensitive area, the elements having a focusing shape that provides waveguide functionality, i.e., focusing the acoustic wave energy to a narrow area along a center line of the array axis, without requiring a further waveguide core structure.

22 Claims, 7 Drawing Sheets

FOCUSING-SHAPED REFLECTOR ARRAYS FOR ACOUSTIC TOUCHSCREENS

FIELD OF INVENTION

The present invention relates to acoustic touchscreens and, in particular, to acoustic touchscreens employing focusing-shaped reflective arrays to transmit and receive acoustic signals into and out of a touch-sensitive area.

BACKGROUND AND RELATED ART

Figure 1:
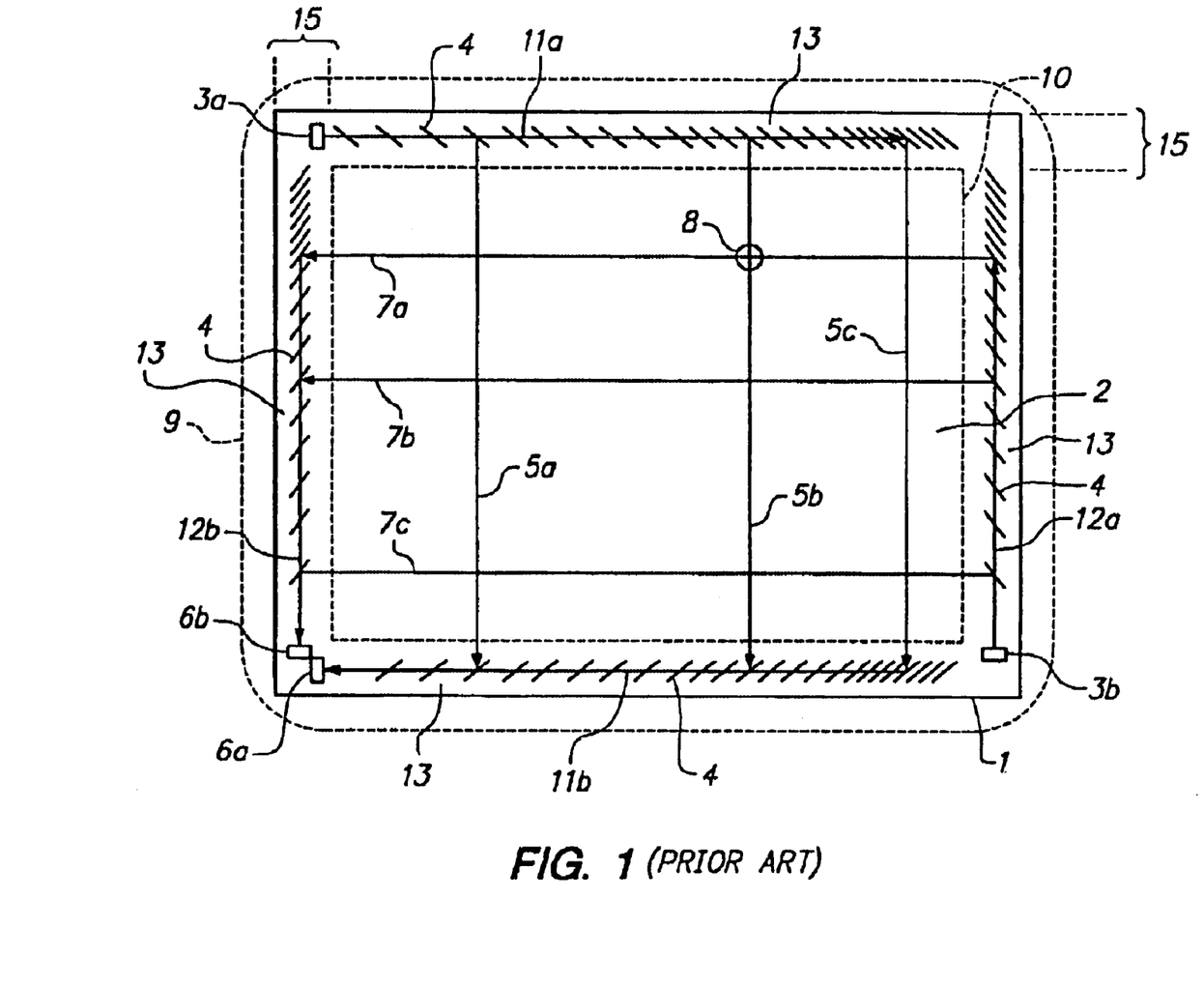
FIG. 1 is a schematic plan view of a conventional acoustic touchscreen.

An acoustic touchscreen has a touch-sensitive area on which the occurrence and location of a touch on a surface is sensed by the effect of the touch on the transmission of acoustic waves propagated across the surface. FIG. 1 illustrates the operation of a conventional acoustic touchscreen 1, having an active, or "touch-sensitive" area 2. A first transmitting transducer 3a is positioned outside of the touch-sensitive area 2 and acoustically coupled to the surface of touchscreen 1. The transducer 3a sends an acoustic signal in the form of an acoustic wave (or beam) 11a traveling parallel to the top edge, and generally in the plane of, touchscreen 1. Aligned in the transmission path of acoustic wave 11a is a first linear array 13 of acoustically reflective elements 4, each of which partially reflects (by approximately 90 degrees) and partially transmits (i.e., passes through) the acoustic wave 11a, creating a plurality of acoustic waves (exemplary ones shown as 5a, 5b, and 5c) traveling vertically (parallel to the Y-axis) across touch-sensitive area 2.

For simplicity, as used in this specification and claims that follow, an "acoustically reflective" element includes any element which at least partially reflects acoustic wave energy, even if such element may actually pass through nearly all of the wave energy. For example, depending on the size of the touch-sensitive area, the number of elements used in the reflective array, the energy of the acoustic signal and/or other factors, it may be possible that an individual reflective array element reflects as little as 1% or less of an acoustic wave into the touch-sensitive area, while passing through the remaining wave energy to the next successive array element.

Returning to FIG. 1, the spacing of the reflective array elements 4 is variable to compensate for the attenuation of the acoustic waves with increasing distance from first transmitter 3a. Alternately, such compensation may be provided by densely spaced reflective array elements with variable reflective strengths. Upon reaching the lower edge of touchscreen 1, the acoustic waves 5a, 5b, and 5c are again reflected by approximately 90 degrees (shown by arrow 11b) by a second linear array 13 of acoustically reflective elements 4 towards a first receiving transducer 6a, where they are detected and converted to electrical signals for data processing. Along the left and right edges of touchscreen 1 are located a similar arrangement. A second transmitting transducer 3b generates an acoustic wave 12a along the left edge, and a third linear array 13 of acoustically reflective elements 4 creates therefrom a plurality of acoustic waves (exemplary 7a, 7b, and 7c) traveling horizontally (parallel to the X-axis) across touch-sensitive area 2. Acoustic waves 7a, 7b, and 7c are redirected (arrow 12b) by a fourth linear array 13 of acoustically reflective elements 4 towards receiving transducer 6b, where they are detected and converted to electrical signals.

If the touch-sensitive area 2 is touched at position 8 by an object such as a finger or a stylus, some of the energy of the acoustic waves 5b and 7a is absorbed by the touching object. The resulting attenuation is detected by receiving transducers 6a and 6b as a perturbation in the acoustic signal. A time delay analysis of the data with the aid of a microprocessor (not shown) allows determination of the coordinates of position 8. Those skilled in the art will appreciate that it is not essential to have two sets of transmitting/receiving transducers to make a touchscreen. The device of FIG. 1, without one set of transducers, will still function as a touchscreen, detecting the occurrence of a touch and providing limited location information (i.e., one of the coordinates). Or, a touchscreen can be designed with only two transducers by using a common transmit/receive transducer scheme as shown in FIG. 11 of U.S. Pat. No. 4,880,665.

A bezel (outline indicated by a dotted lines 9 and 10 in FIG. 1), typically made of molded polymer or sheet metal, overlays the touchscreen 1, concealing the transmitting and receiving transducers, the reflective elements, and other components, and defining the touch-sensitive area 2. This arrangement protects the concealed components from contamination and/or damage, presents a more aesthetically pleasing appearance, and defines the touch-sensitive area for the user. The touch-sensitive area 2 is surrounded by border regions 15 (only two labeled), where the reflective elements 4 and the transmitting and receiving transducers 3a, 3b, 6a, and 6b are located. Reducing the width of border regions 15 increases the percentage of the frontal area of the device that may be allocated to touch-sensitive area 2, as well as conveying a less cumbersome, sleeker design.

Figure 2:
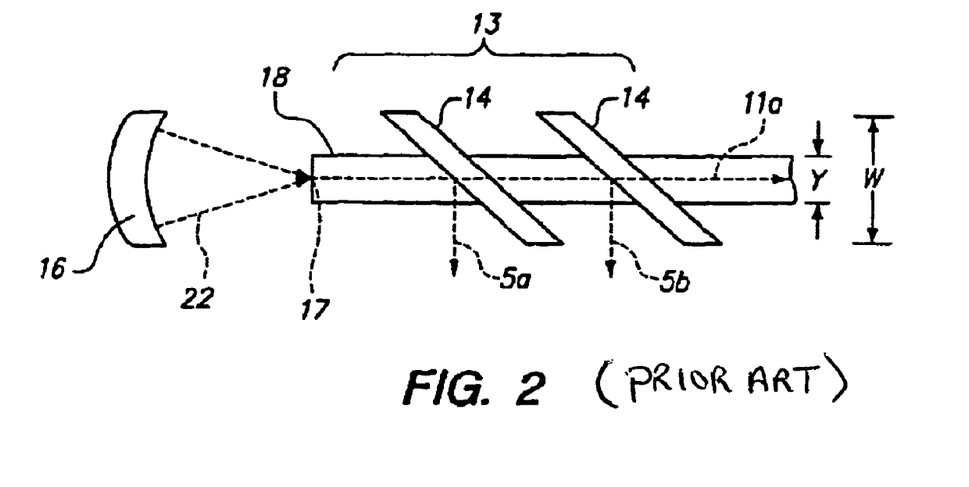
FIG. 2 is a waveguide-reflective array combination for use in an acoustic touchscreen.
Figure 3:
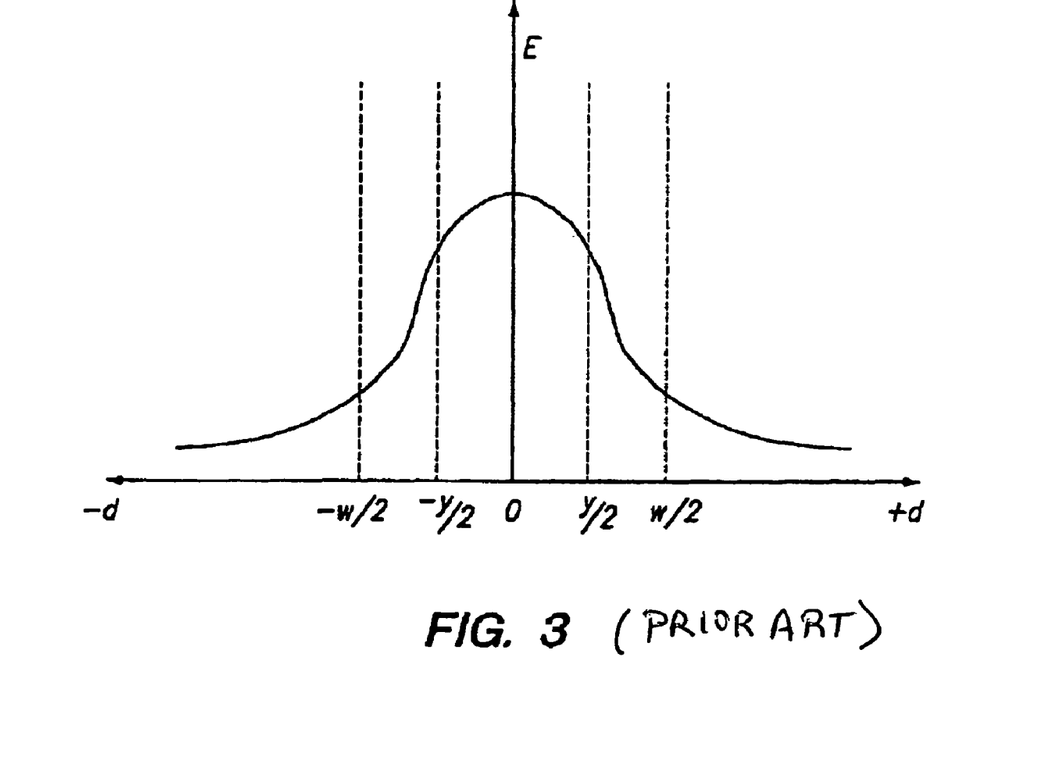
FIG. 3 is a schematic graph of acoustic energy along the width of the waveguide-reflective array of FIG. 2.

U.S. Pat. No. 6,636,201, which is incorporated herein by reference for all that it teaches, discloses acoustic touchscreens having relatively narrower border regions 15. The key to reducing their width lies with reducing the width of arrays 13 and the transducers (3a, 3b, 6a, 6b). FIG. 2 illustrates a transducer 16 and a reflective array 13 of an acoustic touchscreen that allows for a narrower border region than in conventional touchscreens. In particular, the path of the acoustic wave 11a is confined by an acoustic waveguide core 18. The reflective array 13 includes a plurality of acoustically reflective elements 14 cooperating with the waveguide core 18. In the illustrated embodiment, the reflective elements 14 are overlaid on top of the waveguide core 18 at predetermined intervals, which effectively allows the reflective elements 14 to partially deflect energy from the incoming acoustic wave 11a across the touch-sensitive area as the acoustic waves 5a and 5b. As illustrated in FIG. 3, a significant portion of the acoustic energy is confined to the array 14 of width w as a result of the inclusion of the waveguide core 18 of width y. Because the width of the acoustic wave energy can be controlled by the width of the waveguide core 18, the reflectors 14 may be made correspondingly narrower than conventional ones, but yet deflect a sufficient amount of acoustic energy across the touch-sensitive area for touch-sensing purposes

SUMMARY OF THE INVENTION

In accordance with one aspect of the invention, an acoustic touchscreen is provided with an array of focusing-shaped, acoustically reflective elements positioned to transmit or receive acoustic signals into or out of a touch-sensitive area. As used in this specification and in the claims that follow, a "focusing-shaped" reflective array element is one that tends to focus the portion (typically most all) of the acoustic wave energy being passed through the respective element to an area proximate a center line axis of the array. The focusing-shaped elements are located on or in the touchscreen substrate in the path of the acoustic wave energy, and have a velocity-slowing effect, or equivalently a phase-delaying effect, relative to the surrounding touchscreen substrate. Each element's velocity-slowing effect strengthens proximate its center by varying one or both of its width and height along its transverse dimension, (i.e., along its dimension transverse to the propagating wave energy), with a maximum width and/or height proximate its center, tapering to a minimum width and/or height at its transverse ends. The natural divergence of the wave energy is countered by the tendency of the elements to pull the wave energy towards the center line of the array axis, where the maximum propagation delay through the respective elements is encountered. In this manner, the focusing-shaped elements provide waveguide functionality without requiring a separate waveguide core structure.

In an exemplary embodiment, a touchscreen includes a substrate capable of propagating acoustic waves and having a touch-sensitive area. A linear array of focusing-shaped acoustically reflective elements is provided lying in or on the substrate and positioned to transmit or receive acoustic signals into or out of the touch-sensitive area. By way of example, the reflective elements may have a varying width dimension, with a maximum width proximate their center. By way of another example, the reflective elements may have a varying height dimension, with a maximum height proximate their center.

In one embodiment, the reflective elements are grooves located in a surface of the substrate and positioned at an angle relative to an array axis, each element having a varying depth from the substrate surface, with a maximum depth proximate its center. The groves may be at least partially filled with a medium having a different (i.e., slower) acoustic wave propagation speed than the substrate medium.

In embodiments of the invention, the reflective array elements may be located on a surface of, or partially or fully embedded in, the substrate. In certain embodiments, the touchscreen further includes a waveguide core substantially aligned with the reflective array axis.

Other and further aspects, embodiments and features of the invention will be evident from the following detailed description and illustrated embodiments, which are intended to demonstrate, but not limit, the invention.

BRIEF DESCRIPTION OF THE DRAWINGS

The drawings illustrate the design and utility of embodiments of the invention, in which similar elements are referred to by common reference numerals, and in which.

DETAILED DESCRIPTION OF THE ILLUSTRATED EMBODIMENTS

Figure 4:
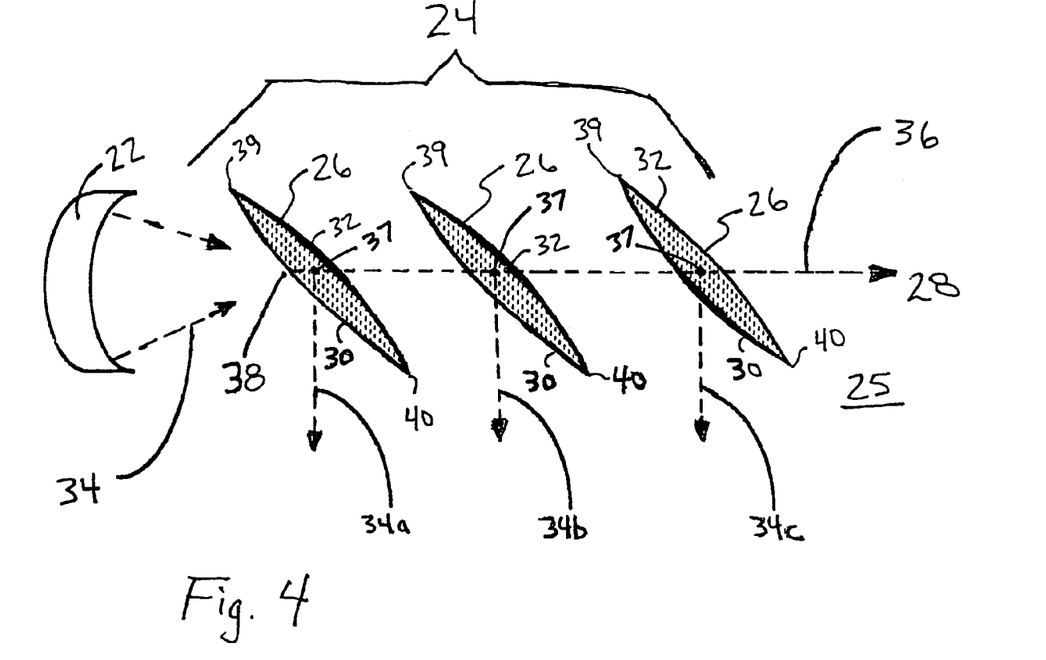
FIG. 4 is a plan view of an exemplary embodiment of a focusing-shaped reflective array in accordance with the present invention.
Figure 5A:
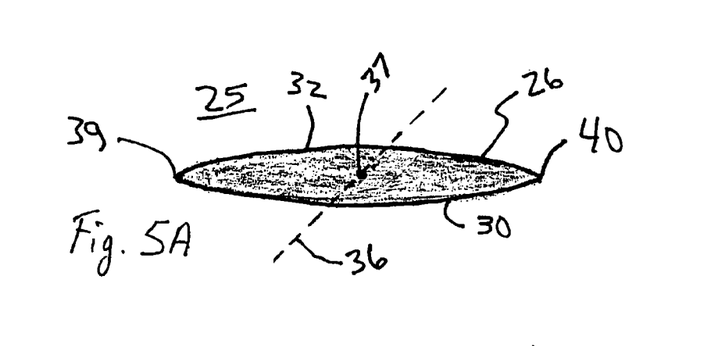
FIGS. 5A and 5B are plan and side views, respectively, of a focusing-shaped reflective element of the array of FIG. 4.
Figure 5B:
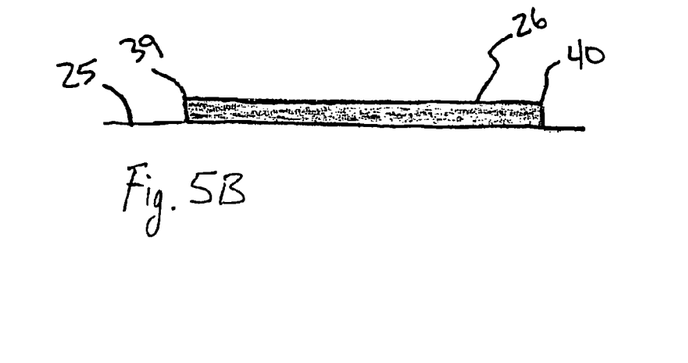

FIG. 4 illustrates a transducer 22 and a linear reflective array 24 for use in transmitting an acoustic beam 34 emitted from the transducer 22 across a touch-sensitive area (not shown) of an acoustic touchscreen (e.g., glass) substrate 25. The reflective array 24 includes a plurality of acoustically reflective focusing-shaped elements 26. In particular, the reflective elements 26 are lens-shaped, i.e., having a parabolic profile, and are positioned at an angle (approximately 45 degrees) relative to an axis 28 of the reflective array 24. Each reflective element 26 has a proximal facing convex surface 30 and a distal facing convex surface 32, the respective surfaces 30 and 32 tapering to respective transverse ends 39 and 40 of the element 26. FIGS. 5A and 5B are plan and side views of the array elements 26 shown in FIG. 4, which are formed on a surface of the substrate 25.

The array axis 28 is aligned with the transmission path of the acoustic beam 34, such that each element 26 partially reflects (by approximately 90 degrees) and partially transmits (i.e., passes through) the acoustic beam 34, creating a plurality of acoustic waves (exemplary ones shown as 34a, 34b, and 34c) traveling into the touch-sensitive area (not shown). Because of the focusing-shape of the reflective elements 26, that portion (typically nearly all) of the energy of the acoustic beam 34 passing through the respective elements 26 is focused to a relatively narrow area proximate a center line 36 passing through a center point 37 of each of the respective elements 26 and parallel to the array axis 28.

As will be appreciated by those skilled in the art, the respective widths of the reflective elements 26 are exaggerated for purposes of illustration, and in an actual embodiment, the array elements are preferably very thin. What matters (and is emphasized by the exaggerated widths of the illustrated embodiments of the reflective elements 26) is that each element imposes a velocity-slowing effect on the acoustic beam 34, which strengthens proximate its respective center point 37. This may be accomplished by varying one or both of a width or height of the element 26 along its transverse dimension, i.e., along that dimension transverse to the propagating wave energy, with a maximum width and/or height proximate its center 37, tapering to a minimum width and/or height at its transverse ends 39, 40. In this manner, the natural divergence of the wave energy is countered by the tendency of the elements to pull the wave energy of the beam 34 towards the center line 36 of the array axis 28, where the maximum propagation delay through the respective elements 26 is encountered.

Thus, the reflective array elements 26 do not so much focus the acoustic beam 34, but instead effectively cancel the de-focusing effect of the natural diffractive spreading of the beam 34, so that the transverse width of the beam 34 (i.e., relative to the array axis 28) remains substantially the same when it reaches each successive reflective element 26 in the array 24. Each reflective element 26, in turn, counteracts the effects of diffractive spreading, keeping the width of beam 34 indefinitely narrow, thus providing a waveguide function without requiring use of a separate waveguide core. Because the width of the acoustic beam 34 is kept relatively narrow by the array elements 26, the elements 26 may be made correspondingly narrower than in conventional reflective arrays used in acoustic touchscreens, but still deflect a sufficient amount of acoustic energy across the touch-sensitive area of the substrate 25 for touch-sensing purposes.

It will be understood that the wave energy of the acoustic beam 34 propagates in the substrate 25, with a significant power density at the surface. However, for ease in illustration of the inventive concepts, the propagation of the acoustic beam 34 is described herein as being two-dimensional in the surface of the substrate 25. In particular, the reflective array elements 26 located on or near the surface sufficiently interact with the wave energy to affect wave propagation velocities as described above, thereby "focusing" the energy of the beam 34 proximate the center line 36 of the array axis 28.

In certain embodiments, typically but not necessarily used in conjunction with Rayleigh waves (a term which, as used herein, subsumes quasi-Rayleigh waves), and for which the disclosed embodiments of the invention are applicable, the transmitting transducer 22 can be a focusing transducer, in which the beam 34 of acoustic waves comes to a focus at a focal location 38 proximate the center of the proximal surface 30 of the most proximal element 26. Because the wave energy in beam 34 is not precise, the focal location 38 is not a mathematical spot, but rather a "neck" in the width of the beam 34. If the respective reflective array elements 26 were not in the path of the acoustic beam 34, it would diverge after the focal neck 38. A receiving transducer (not shown) may also be a focusing type, with similar advantages. As will be apparent to those skilled in the art, the foregoing teaching regarding the use of a focusing transducer will be applicable to further embodiments of the invention, both illustrated and not illustrated herein. For purposes of brevity, however, it will not be specifically discussed in each instance.

Figure 6A:
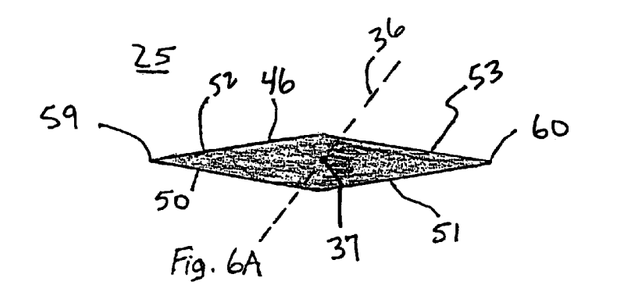
FIGS. 6A and 6B are plan and side views of an alternate embodiment of a focusing-shaped reflective element for use in the array of FIG. 4.
Figure 6B:
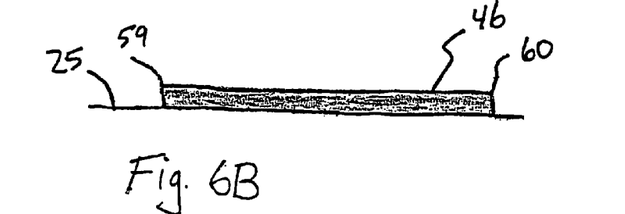

FIGS. 6A and 6B illustrate an alternate focusing-shaped element 46 that may be formed on the touchscreen substrate 25 for use in the reflective array 24 of FIG. 4, the element 46 having a diamond shape in plan view. In particular, the element 46 has a pair of proximal facing flat surfaces 50 and 51, which are angled proximally from respective ends 59 and 60 away from center 37. Similarly, a pair of distal facing flat surfaces 52 and 53 are angled distally from the respective ends 59 and 60, away from the center 37. As with elements 26, the resultant phase delay profile of the portion of the acoustic beam 34 passing through element 46 will be "focused" to an area proximate center line 36.

Figure 7A:
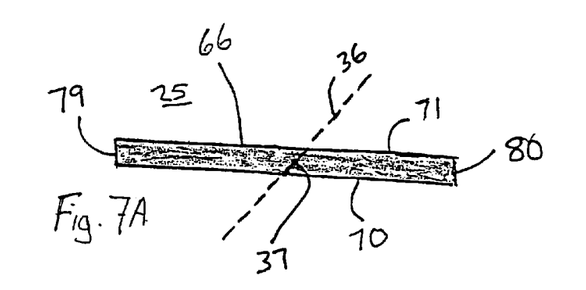
FIGS. 7A and 7B are plan and side views of another embodiment of a focusing-shaped reflective element for use in the array of FIG. 4.
Figure 7B:
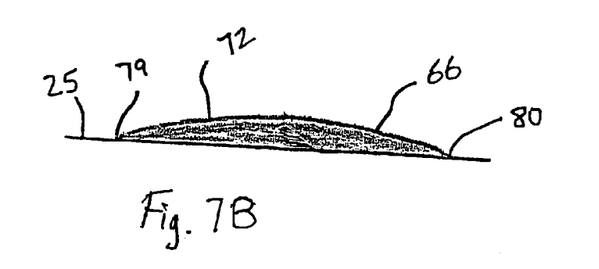
Figure 8A:
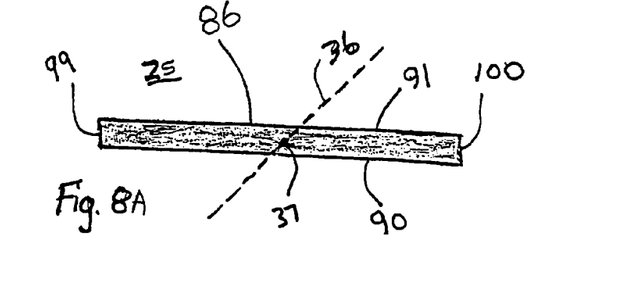
FIGS. 8A and 8B are plan and side views of yet another embodiment of a focusing-shaped reflective element for use in the array of FIG. 4.
Figure 8B:
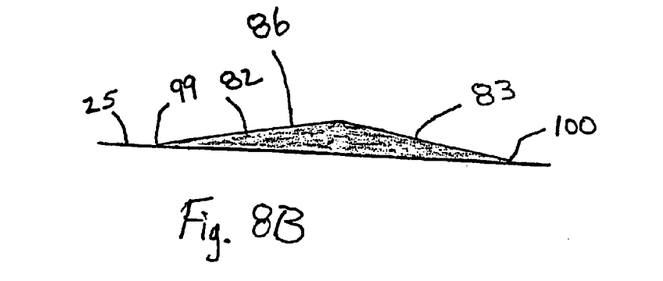

FIGS. 7A-B and 8A-B illustrate further alternate focusing-shaped elements 66 and 86, respectively, that may be formed on the touchscreen substrate 25 for use in the reflective array 24 of FIG. 4. In particular, reflective elements 66 and 86 each have a varying height dimension, as opposed to the varying width dimension of reflective elements 26 and 46, with element 66 having a parabolic height profile and element 86 having a triangular height profile. With reference to FIGS. 7A and 7B, element 66 has flat proximal and distal facing surfaces 70 and 71, with a parabolic top surface 72. The top surface 72 has a maximum height proximate a center 37 of the element 66, tapering to the surface of the substrate 25 at respective ends 79 and 80. With reference to FIGS. 8A and 8B, element 86 has flat proximal and distal facing surfaces 90 and 91, with a pair of flat top surfaces 82 and 83 extending from the surface of the substrate 25 at ends 99 and 100 to meet at a maximum height proximate a center 37 of the element 86.

As with elements 26 and 46, the resultant phase delay profile of the portion of the acoustic beam 34 passing through elements 66 and 86 will be focused to an area proximate center line 36 of the array axis 28. In alternate embodiments, elements 66 and/or 86 may optionally also have a varying width dimension. Further, it will be appreciated that focusing-shaped reflective elements in a single array may include elements with one or both of a varying width dimension and a varying height dimension, with one or both of a maximum width and a maximum height proximate a center of the respective element.

While the focusing-shaped reflective elements 26, 46, 66 and 86 have been illustrated and described as formed on a surface of the touchscreen substrate 25, it may be desirable to form one or more of the reflective elements of an array partially or completely embedded in the touchscreen substrate, depending on the acoustic waves employed in the particular embodiment and/or other design considerations. For example, acoustic touchscreens may employ waves other than Rayleigh waves, such as shear and Lamb waves, or combinations of different types of acoustic waves (including combinations involving Rayleigh waves). Shear waves (e.g., ZOHPS and HOHPS) and Lamb waves have significant acoustic power density at both the top and bottom surfaces of the substrate in which they travel. Also, the particular focusing-shaped reflective elements in a particular array and/or touchscreen may be formed differently, e.g., with some located on a surface, and others partially or fully embedded in the touchscreen substrate.

Figure 9A:
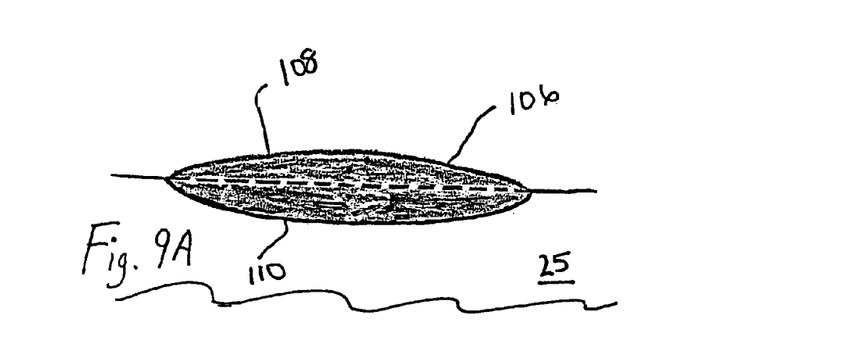
FIGS. 9A and 9B are sectional side views of still further embodiments of focusing-shaped reflective array elements for use in the array of FIG. 4.
Figure 9B:
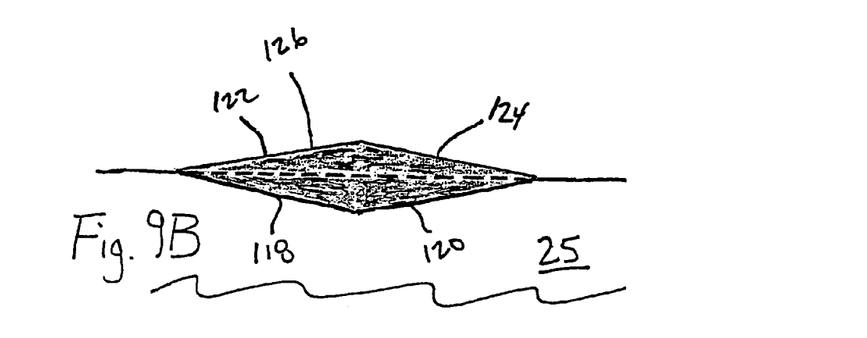

FIGS. 9A and 9B illustrate further focusing-shaped elements 106 and 126, respectively, which are formed partially embedded in the touchscreen substrate 25, and which may be used in reflective array 24 of FIG. 4. As with above-described elements 66 and 86, the reflective elements 106 and 126 each have a varying height dimension along a transverse length, but with element 106 having a full parabolic side profile and element 126 having a diamond-shaped side profile. More particularly, with reference to FIG. 9A, element 106 has top and bottom parabolic surfaces 108 and 110, respectively. The top surface 108 has a maximum height, and the bottom surface 110 a maximum depth, respectively, relative to the surface of the substrate 25 proximate a center of the element 106. With reference to FIG. 9B, element 126 has a pair of flat top surfaces 122 and 124, which extend from the substrate 25 to meet at a maximum height proximate a center of the element 126, and a pair of flat bottom surfaces 118 and 120, which extend from the substrate 25 to meet at a maximum depth proximate the center. Elements 106 and/or 126 may optionally also have a varying width dimension. As with the previously described focusing-shaped reflective array elements, the resultant phase delay profile of the portion of an acoustic wave passing through elements 106 and 126 will be focused within an area proximate the center line 36 of the array axis 28.

Figure 10A:
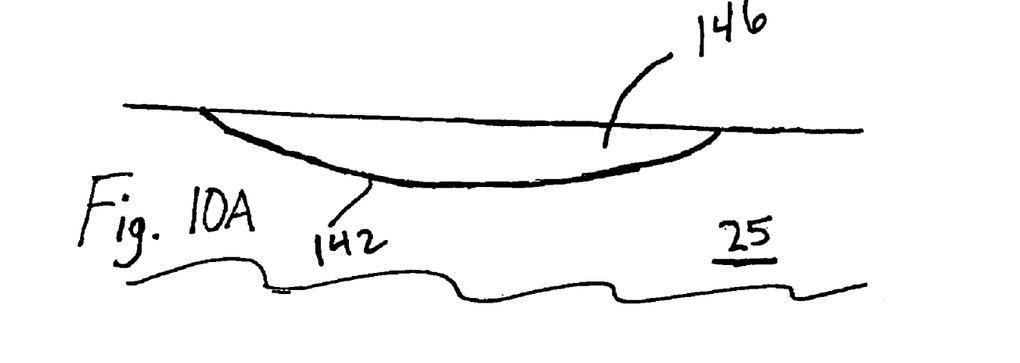
FIGS. 10A, 10B and 10C are sectional side views of yet further embodiments of focusing reflective array elements for use in the array of FIG. 4.
Figure 10B:
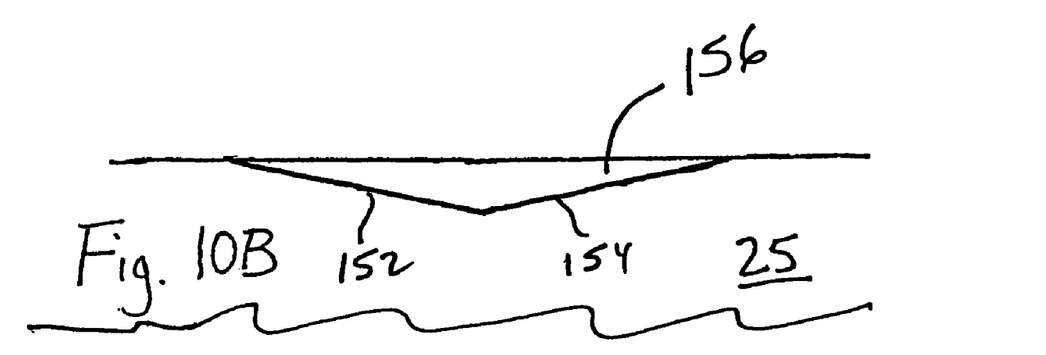
Figure 10C:
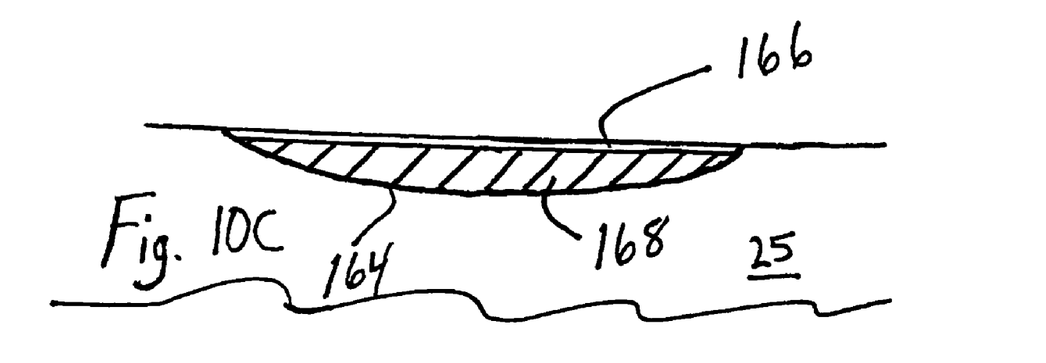

FIGS. 10A, 10B and 10C illustrate still further focusing-shaped elements 146, 156 and 166, respectively, which may be used in reflective array 24 of FIG. 4. In particular, elements 146, 156 and 166 are grooves formed in a surface of the substrate 25, each having a varying depth dimension relative to the surface of the substrate 25. Elements 146 and 166 each have a half-parabolic side profile, and element 156 has a triangular side profile. More particularly, with reference to FIG. 10A, element 146 has a parabolic bottom surface 142, with a maximum depth relative to the surface of the substrate 25 proximate its center. With reference to FIG. 10B, element 156 has a pair of flat bottom surfaces 152 and 154, which extend from the substrate 25 to meet at a maximum depth proximate the center of the element 156. With reference to FIG. 10C, element 166 has a parabolic bottom surface 164, with a maximum depth relative to the surface of the substrate 25 proximate its center. Element 166 is similar to element 146, except that element 146 is empty, whereas element 166 is substantially filled with a medium 168 different (i.e., and having a slower wave propagation speed) than the substrate medium. Examples of such mediums include glass and/or silver-loaded glass frit, as well as polymer inks, such as those disclosed in U.S. Pat. Nos. 5,648,643 and 5,883,457, which are fully incorporated herein by reference. Any of elements 146, 156 and/or 166 may optionally also have a varying width dimension. As with the previously described focusing-shaped reflective array elements, the resultant phase delay profile of the portion of an acoustic wave passing through elements 146, 156 and 166 will be focused within an area proximate the center line 36 of the array axis 28.

As will further be apparent to those skilled in the art, the particular geometric shapes of the above-described embodiments are presented for illustration, and are by no means exhaustive of the types of focusing-shapes that are possible for practicing the invention. Although a focusing-shaped reflective array provides waveguide functionality, it may be desirable in certain embodiments to further employ a waveguide core, along with a focusing-shaped reflective array, in the acoustic transmission path.

Figure 11:
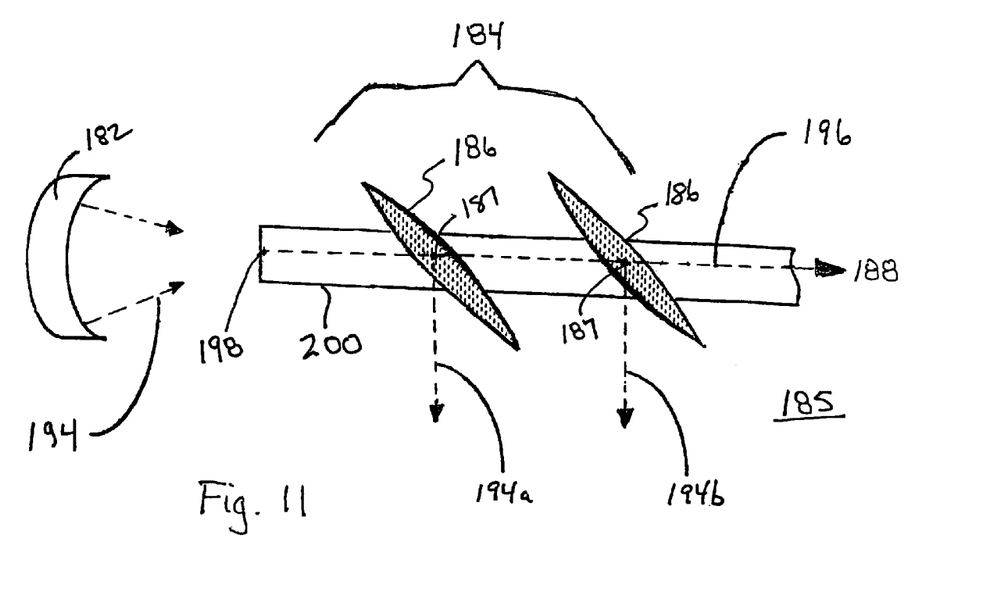
FIG. 11 is a plan view of a further exemplary embodiment of a focusing-shaped reflective array cooperating with a waveguide core in accordance with a further aspect of the present invention.

One such embodiment is illustrated in FIG. 11, which includes a focusing transducer 182 and a focusing-shaped reflective array 184 in cooperation with a waveguide core 200 for transmitting an acoustic beam 194 emitted from the transducer 182 across a touch-sensitive area (not shown) of an acoustic touchscreen substrate 185. The reflective array 184 includes a plurality of acoustically reflective, lens-shaped elements 186, similar to elements 26 in the embodiment of FIG. 4, which are positioned at an angle (approximately 45 degrees) relative to an axis 188 of the reflective array 184. The waveguide core 200 and array axis 188 are aligned with the transmission path of the acoustic beam 194, such that each element 186 partially reflects (by approximately 90 degrees) and partially transmits (i.e., passes through) the acoustic beam 194, creating a plurality of acoustic waves (exemplary ones shown 194a and 194b) traveling into the touch-sensitive area (not shown).

Both the waveguide core 200 and the focusing-shape of the array elements 186 cause that portion of the energy of the acoustic beam 194 which passes through the centers 187 of the respective elements 186 to be focused within a transmission area proximate a center line 196. The focusing transducer 182 generates the beam 194 of acoustic waves that come to a focus at a focal point 198 proximate center line 196 at the entrance of the waveguide core 200. Notably, the waveguide core 200 and reflective array elements 186 may be coupled to and/or partially or fully embedded in the same or different surfaces of the touchscreen substrate 185. By way of non-limiting examples, the reflective array elements 186 may be positioned underlying or overlaying the waveguide core 200. Exemplary constructions of a waveguide core and reflective elements are provided in the above-incorporated U.S. Pat. No. 6,636,201.

In certain embodiments of the invention (with or without employing a waveguide core), it may be possible that not all of the reflective array elements are focusing-shaped; but so long as at least some of the elements are focusing-shaped, those elements of such array comprise a focusing-shaped reflective array, as described and claimed herein. In other words, the mere inclusion of one or more non-focusing reflective elements does not preclude the array—or portions thereof—from functioning as a focusing-shaped reflective-element array.

The foregoing detailed description of illustrated embodiments of the invention includes passages that are chiefly or exclusively concerned with particular parts or aspects of the invention or particular embodiments. It is to be understood that this is for clarity and convenience, and that a particular feature may be relevant in more than just the passage in which it is disclosed and embodiment in which it is described. Similarly, although the various figures and descriptions herein relate to specific embodiments of the invention, it is to be understood that where a specific feature is disclosed in the context of a particular figure or embodiment, such feature may also be used, to the extent appropriate, in the context of another figure or embodiment, in combination with another feature, or in the invention in general.

Further, while the present invention has been particularly described in terms of certain illustrative embodiments, the invention is not limited to such embodiments. Rather, the scope of the invention is defined by the appended claims.

What is claimed is:

1. A touchscreen, comprising:
A substrate capable of propagating acoustic waves, the substrate having a touch-sensitive area; and
an array of acoustically reflective elements lying in or on the substrate, the array having an axis, the reflective array elements positioned at an angle relative to the array axis to transmit or receive acoustic signals into or out of the touch-sensitive area, the reflective array elements having a focusing shape that serves to focus acoustic wave energy passing through the elements to an area proximate a center line of the array axis, at least one reflective array element having at least one of (a) a varying width dimension with a maximum width proximate its center and (b) a varying height dimension with a maximum height proximate its center.

2. The touchscreen of claim 1, at least one reflective array element located on a surface of the substrate.

3. The touchscreen of claim 1, at least one reflective array element at least partially embedded in the substrate.

4. The touchscreen of claim 1, at least one reflective array element having both of a varying width dimension and a varying height dimension, with a maximum width and a maximum height proximate its center.

5. The touchscreen of claim 1, at least one reflective array element comprising a groove having a varying depth in a surface of the substrate, with a maximum depth proximate its center.

6. The touchscreen of claim 5, the substrate comprising a first medium, the groove being at least partially filled with a second medium.

7. The touchscreen of claim 1, at least one reflective array element having a parabolic profile.

8. The touchscreen of claim 7, each of the at least one reflective array element having respective proximal facing and distal facing convex surfaces.

9. The touchscreen of claim 1, at least one reflective array element having a tapered profile.

10. The touchscreen of claim 1, further comprising a waveguide core substantially aligned with the array axis.

11. The touchscreen of claim 10, the reflective array elements overlaying the waveguide core.

12. A touchscreen, comprising:
- a substrate capable of propagating acoustic waves, the substrate having a touch-sensitive area;
- a first array of acoustically reflective elements lying in or on the substrate, the first array having an axis and the reflective array elements of the first array being positioned at an angle relative to the first array axis and positioned to transmit acoustic signals into the touch-sensitive area; and
- a second array of acoustically reflective elements lying in or on the substrate, the second array having an axis and the reflective array elements of the second array being positioned at an angle relative to the second array axis and positioned to receive acoustic signals transmitted by the first array after the acoustic signals have traveled across the touch-sensitive area,
- at least one of the first and second reflective array elements having a focusing shape that serves to focus acoustic wave energy passing through the elements to an area proximate a center line of the array axis, and the at least one of the first and second reflective array elements having at least one of (a) a varying width dimension with a maximum width proximate its center and (b) a varying height dimension with a maximum height proximate its center.

13. The touchscreen of claim 12, the first reflective array having a first array axis, the second reflective array having a second array axis, further comprising a first transducer acoustically coupled to the substrate and positioned to transmit an acoustic signal along the first array axis, and a second transducer acoustically coupled to the substrate and positioned to receive an acoustic signal traveling along the second array axis.

14. The touchscreen of claim 13, one or both of the first and second transducers comprising a focusing transducer.

15. The touchscreen of claim 12, the first reflective array having a first array axis, further comprising a waveguide core substantially aligned with the first array axis.

16. The touchscreen of claim 12, the second reflective array having a second array axis, further comprising a waveguide core substantially aligned with the second array axis.

17. The touchscreen of claim 12, each of the first and second reflective array elements having a focusing shape.

18. The touchscreen of claim 12, each of the first and second reflective array elements having one or both of a varying width dimension and a varying height dimension, with one or both of a maximum width and a maximum height proximate its center.

19. A touchscreen, comprising:
- a substrate capable of propagating acoustic waves, the substrate having a touch-sensitive area and a border region adjacent the touch-sensitive area;
- a first array of acoustically reflective elements lying in or on the substrate and positioned in a first portion of the border region for transmitting acoustic signals into the touch-sensitive area, the first array having a first array axis, and the reflective array elements of the first array being positioned at an angle relative to the first array axis; and
- a second array of acoustically reflective elements lying in or on the substrate and positioned in a second portion of the border region to receive acoustic signals transmitted by the first array after the acoustic signals have traveled across the touch-sensitive area, the second array having a second array axis, and the reflective array elements of the second array being positioned at an angle relative to the second array axis,
- the first and second reflective array elements having a focusing shape that serves to focus acoustic wave energy passing through the elements to an area proximate a center line of the first and second array axis, respectively, at least one of the first and second reflective array elements having at least one of (a) a varying width dimension with a maximum width proximate its center and (b) a varying height dimension with a maximum height proximate its center.

20. The touchscreen of claim 19, each of the first and second array elements having one or both of a varying width dimension and a varying height dimension, with one or both of a maximum width and a maximum height proximate a center of the element.

21. The touchscreen of claim 20, each of the first and second array elements having a parabolic profile.

22. The touchscreen of claim 21, further comprising a first transducer acoustically coupled to the substrate in the first portion of the border region and positioned to transmit an acoustic signal along the first array axis, and a second transducer acoustically coupled to the substrate in the second portion of the border region and positioned to receive an acoustic signal traveling along the second array axis.

* * * * *